Jan. 6, 1925.
1,522,330
J. H. SAYRES
BOBBIN, BEAM, SPOOL, WHEEL, AND THE LIKE
Filed March 1, 1924   2 Sheets-Sheet 1
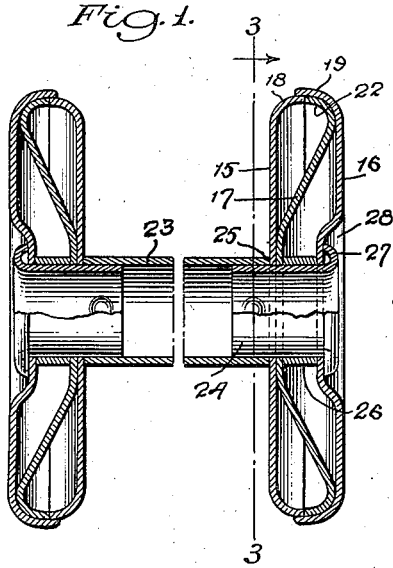
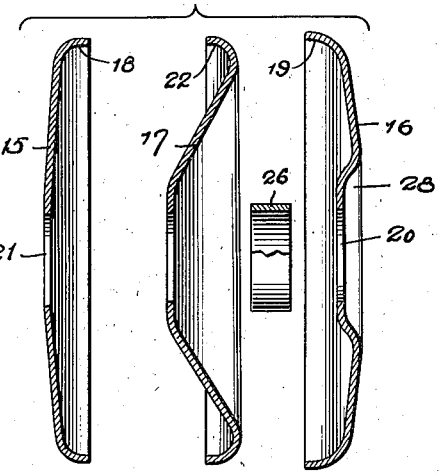
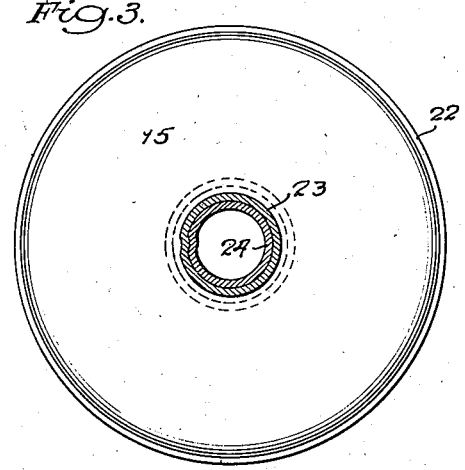
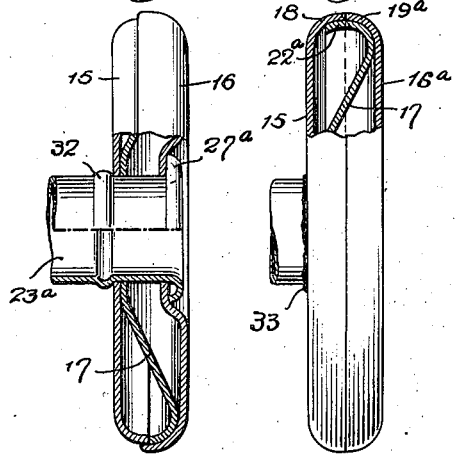
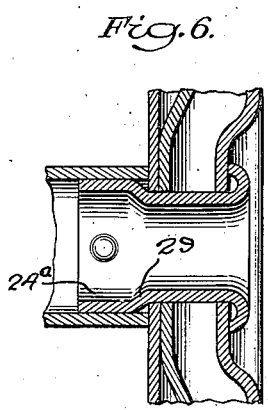
INVENTOR
JOHN H. SAYRES
BY
ATTORNEYS Jan. 6, 1925.                                                              1,522,330
J. H. SAYRES
BOBBIN, BEAM, SPOOL, WHEEL, AND THE LIKE
Filed March 1, 1924                    2 Sheets-Sheet 2
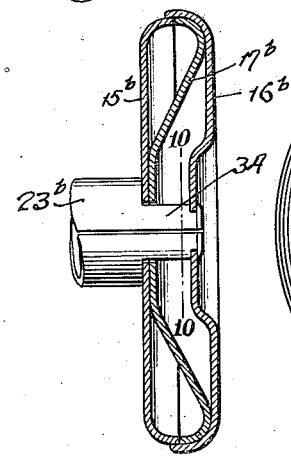
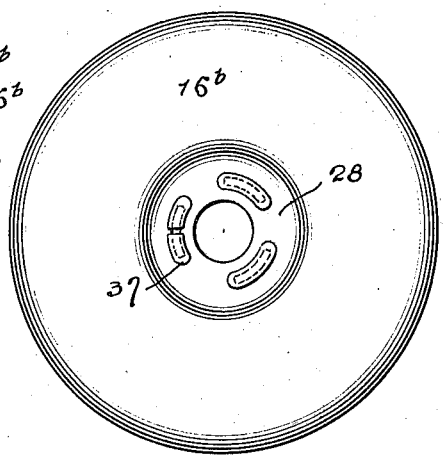
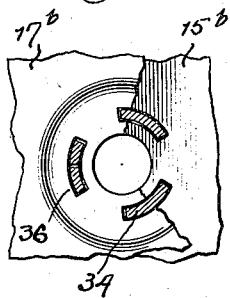
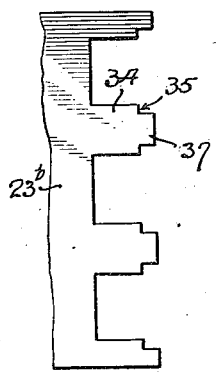
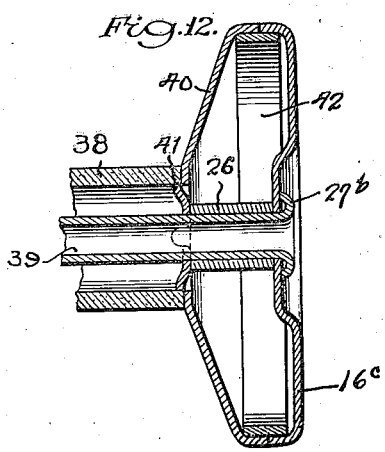
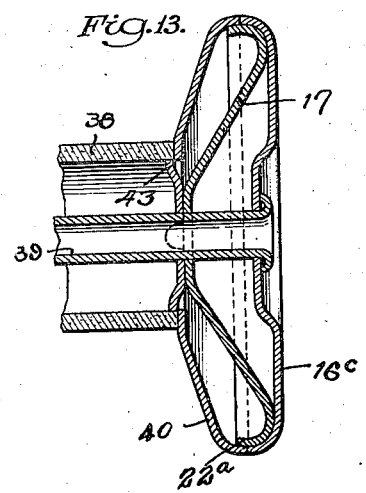
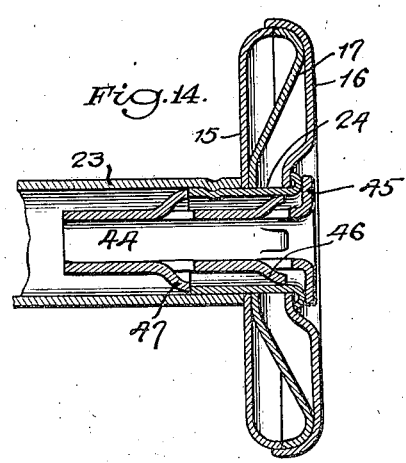
INVENTOR
JOHN H. SAYRES
BY
ATTORNEYS Patented Jan. 6, 1925.

1,522,330

UNITED STATES PATENT OFFICE.

JOHN H. SAYRES, OF BROOKLYN, N. Y.

BOBBIN, BEAM, SPOOL, WHEEL, AND THE LIKE.

Application filed March 1, 1924. Serial No. 696,221.

*To all whom it may concern:*

Be it known that I, JOHN H. SAYRES, a citizen of the United States of America, residing in the city of New York, borough of Brooklyn, in the county of Kings and State of New York, have invented certain new and useful Improvements in Bobbins, Beams, Spools, Wheels, and the like, of which the following is a specification.

My invention relates to bobbins, beams, spools, wheels and the like. The invention is particularly applicable to the head construction of a bobbin, spool or the like. Among the special objects of my invention may be mentioned, (1) to provide a head structure formed from relatively hard, and therefore stiff and resilient, sheet metal, and comprising a pair of discs spaced apart and reinforced by an interposed metallic stiffener, preferably of frusto-conical shape; (2) to provide a head structure, the components of which are united to the barrel solely by a hub element of the latter.

The underlying thoughts of my invention are susceptible of embodiment in various forms, some of which are shown in the accompanying drawings, in which—

Fig. 1 is a broken longitudinal section through a bobbin or spool in which my invention is embodied in one form;

Fig. 2 is a section through the detached components of the head;

Fig. 3 is a section on the line 3—3, Fig. 1;

Figs. 4 to 8 inclusive are broken sections through various modifications;

Fig. 9 is an end elevation of the head shown in Fig. 8;

Fig. 10 is a partial broken end elevation of the same;

Fig. 11 is a development of the barrel end; and

Figs. 12, 13 and 14 are sections through other modifications.

I am aware that it has heretofore been proposed to provide structures of sheet metal intended for service as spool or bobbin heads. So far as known, however, such constructions as have heretofore been proposed have been commercially impracticable by reason of the fact that the spool head elements have been of such character and construction that crimping or other operations involving sharp bends have been resorted to for the purpose of securing the parts together. Such crimping operations, however, can be performed only upon relatively thin or soft metal. Sufficient rigidity has therefore not been obtained to render the heads commercially practical, since in use the spools are subjected to rough handling. It will be appreciated that any material deformation of its head unfits the spool for use. It is also quite essential that the connection between the head and the barrel of the spool be free from elements upon which the thread is likely to catch, or which may work loose in use. The outer face of the spool also must lie in a plane substantially at right angles to the axis of the barrel in order to permit the customary drive of the spool to be employed. In many cases it is desirable that the inner face of the head shall lie parallel to the outer face of the head, for example, where the traverse of the thread guide is not variable. In the construction which I have illustrated, all of these various considerations are taken into account.

One important feature of the present invention resides in the fact that the shape and assembly of the spool head components is such that they may all be formed from relatively hard sheet metal. This fact is emphasized because of the importance of rigidity and durability in the spool head for the practical value of the structure.

Referring to Fig. 2, the essential components of my invention are the two oppositely faced discs 15 and 16, and an interposed metallic stiffener, preferably of the frusto-conical shape indicated at 17. As will be noted, there are no sharp curves in any of these pieces, and they are of such design that they may be die formed from relatively hard sheet metal. In their unassembled and initial form, the discs 15 and 16 which form respectively the opposite walls of the spool head, are in commercial production slightly cupped from their marginal flanges 18 and 19 toward their central apertures 20 and 21. In the form illustrated in Figs. 1–3, the peripheral flange 22 of the stiffener 17 registers with the marginal flange 18 of the disc 15, while the marginal flange 19 of the end disc 16 is of slightly greater diameter and is of sufficient width to overlap the abutting edges of the flanges 18 and 22 which it snugly embraces.

The barrel 23 with which the head is associated may have an independent hub bushing 24 telescopically secured therein by any suitable means, for example by spot welding, thus affording a shoulder 25, formed by the end of the barrel proper, against which the face of the disc 15 abuts when the head elements are passed over the bushing 24 in the relation indicated in Fig. 1. If desired, a spacing ring 26 may be slipped over the bushing and interposed between the central areas of the stiffener 17 and the end disc 16. After assembly, sufficient pressure is exerted against the disc 16 to flatten both discs 15 and 16 from their original slightly cupped shape into substantial planity as illustrated in Fig. 1, and while under this pressure the projecting end of the bushing 24 which should be of relatively soft metal, may be rolled over at 27 into engagement with the centrally depressed area 28 of the disc 16 to rigidly unite the parts together. Inasmuch as the flattening of the cupped discs 15 and 16 places the metal under stress, the union between the elements is firmly maintained by reason of the constant effort of the discs to return to their original shape. The relatively hard metal which I employ, e. g., sheet steel, possesses considerable inherent resiliency.

In order to afford a wider bearing shoulder against which the disc 15 abuts, and to provide a component which will cheaply adapt the other components to centering pins of different diameter, the hub bushing 24$^a$ may be inwardly offset as indicated at 29 in Fig. 6. In other respects this construction is similar to that just described.

The bushing 24$^b$ of Fig. 7 is similar to that just described, except that it is somewhat longer to afford room for torch or arc welding at 30 to the barrel 23, instead of spot welding. In this figure I have shown the inner disc 15$^a$ and the stiffener 17 welded together at 31 in this hub area. Where this construction is adapted, the central aperture in the disc 15$^a$ may be made of sufficient diameter to pass over the end of the barrel body 23, against which the hub area of the stiffener 17 abuts.

In the construction in Fig. 4, the barrel hub bushing is dispensed with. An abutment for the head is afforded by the annular fillet 32 formed in the barrel 23$^a$ at a point spaced from its end. After assembly and compression of the head elements upon the barrel end, the portion of the latter which projects beyond the disc 16 is rolled over to form the retaining or locking flange 27$^a$.

Inasmuch as a raised fillet on the barrel may not be desirable, or inasmuch as it may be difficult to form such a fillet in the barrel, the disc 15 may be held in position on the barrel hub by welding, as indicated at 33 in Fig. 5. In this figure I have also indicated a modified peripheral flange arrangement. Here the discs 15 and 16 are of substantially the same diameter, and their flanges 18 and 19$^a$ approach each other, while the peripheral flange 22$^a$ of the stiffener 17 forms a centering support and spacer.

Another modification is indicated in Figs. 8–11, in which the barrel hub is castellated to afford arcuate lugs 34 shouldered at 35. Registering arcuate apertures 36 are formed in the several components of the spool head to receive the lugs 34 which are passed therethrough and their reduce ends 37 offset to rivet the parts togther. The arcuate length of the slots in the inner disc 15$^b$ and stiffener 17$^b$ corresponds to that of the lugs 34, while that of the slots in disc 16$^b$ is less and this disc abuts against the shoulders 35. Accurate rigid spacing of the head components is thus assured. The barrel 23$^b$ for this construction is preferably formed up from flat stock which may be readily castillated by a stamping operation.

In Fig. 12 I have indicated a construction appropriate for a spool having a barrel which comprises inner and outer members 38 and 39. The disc 40 of the head abuts against the outer barrel shell 38 and is centered with respect thereto by struck-out lugs 41. The end disc 16$^c$ is spaced from disc 40 at its hub area by the spacer ring 26, and at its peripheral area by the ring 42. The inner barrel member 39 extends the length of the spool and constitutes in effect a long tubular rivet, the offset ends of which form the retaining flanges 27$^b$ by which the heads are secured to the opposite ends of the barrel. In this construction the inner disc 40 of the spool head is coned to adapt it to thread guides having variable traverse.

The construction indicated in Fig. 13 is in general of the type shown in Fig. 12, except that a conical stiffener 17 is substituted for the ring 42, while the centering lugs 43 are of a shape more readily formed in hard metal of the character employed.

In Fig. 14 I have indicated a bushing construction which may be conveniently employed to reduce the bearing aperture of the spool hub when desired. The head construction and mounting is that illustrated in Fig. 1. The reducer bushing 44 is provided at one end with an abutment flange 45 limiting its insertion into the hub member 24. In order to center the bushing with respect to the latter, the bushing is provided with peripheral series of outwardly struck spring tongues 46 which bear against the inner face of the hub member 24. A second series of outwardly struck spring tongues 47 are so located that upon the insertion of the bushing the tongues 47 pass the inner end of the hub member 24 and snap out into engagement with the inner end of the latter, thus locking the reducer in position. A reducer of this character may be used with any of the constructions shown, although the locking action of the lugs 47 is not obtained in all cases.

The constructions shown and described afford advantages of marked practical value. The spool heads are so constructed that they will remain perpendicular to the barrel under ordinary usage; that the faces of the heads may, when desired, be parallel to each other and at right angles to the axis of the barrel; that the heads have rims of sufficient width to permit shipment of several spools in a box of suitable size without danger that the edge or rim of one spool will be displaced and come into injurious contact with the product carried by an adjacent spool; that the rims of the heads are so constructed that on ordinary usage they will not become bruised, injured or deformed to such an extent, or in such location as is likely to interfere with the use of the spool; that the head can be assembled on the barrel without an objectionable fillet which would be likely to interfere with proper winding thereon; that provision for driving the spool may be made readily by suitably aperturing the outer disc, without danger that the driving element will come into contact with tne product wound on the barrel; that the outer face of the spool head is smooth and plain and is suitable for a frictional drive of vertical spools, as is common in the textile industry; that the head mounting is such that bearing bushings of various diameters may readily be inserted; that the construction and shape of the parts is such that it is practicable to form them from relatively hard sheet metal; that the frusto-conical stiffener reinforces the facing discs of the head so effectively that they will not be sprung out of shape or otherwise injured by rough usage; that by suitably aperturing the outer disc and the frusto-conical reinforcing disc the weight of the head may be materially lightened without appreciably impairing the strength of the parts.

While the construction is primarily designed for spools, etc., employed in the textile industry, the underlying features are also applicable to wheels and my invention contemplates this possible use, and the appended claims are to be so interpreted. Furthermore, while various constructions have been shown, my underlying thoughts may also be embodied in other modifications which do not depart from what I claim as my invention.

I claim—

1. A head construction for spools and the like comprising spaced metallic facing members and an interposed frusto-conical metallic stiffening member extending between said facing members and engaging one of the latter in its central area and the other in its peripheral area, together with means at the hub of the head for holding the parts together.

2. A head construction for spools and the like comprising spaced metallic facing members and an interposed frusto-conical metallic stiffening member extending between said facing members and engaging one of the latter in its central area and the other in its peripheral area, together with means for holding the parts together under stress.

3. A head construction for spools and the like comprising axially spaced metallic facing members and an interposed frusto-conical metal stiffening member extending between said facing members and engaging one of the latter in its central area and the other in its peripheral area, together with means associated with the spool barrel and engaging the end facing member to hold the parts together.

4. A head construction for spools and the like comprising axially spaced metallic facing members and an interposed frusto-conical metallic stiffening member extending between said facing members and engaging one of the latter in its central area and the other in its peripheral area, and flange means integral with certain of said parts affording a peripheral closure for the head.

5. A head construction for spools and the like comprising a metallic facing member centrally apertured to pass over a hub element rigid and permanently associated with the spool barrel and to bear against a shoulder, a second facing member spaced from said first member on the barrel hub and lying in a plane substantially parallel thereto, a frusto-conical stiffener interposed between said members, the end of said hub element being deformed to unite the components of the spool head into a rigid structure.

6. A head construction for spools and the like comprising a pair of spaced metallic plates having their peripheral margins offset toward each other, in combination with a bracing plate extending therebetween and of generally truncated-cone shape, the margin of said bracing plate being offset to cooperate with the offset peripheral margins of the spaced plates as a peripheral closure of the head.

7. A head construction for spools and the like comprising a metallic disc-like inner member, and a frusto-conical stiffener, both centrally apertured to pass over the hub element of a spool barrel shouldered to form an abutment for one of said members, in combination with a metallic disc-like outer head member also passing over said spool hub element and engaging the stiffener between the outer and inner head members, the end of said spool hub element being deformed to unite the elements of the spool head into a rigid structure.

8. A head construction for spools and the like comprising spaced metal plates, an interposed metallic stiffener, said components being centrally apertured in register, a spool hub affording both internal and external shoulders, means integral with the hub for holding the spool head against the external shoulder, and a reducer bushing having springs lugs adapted to engage the internal shoulder to lock the bushing in position.

9. A spool head comprising spaced metallic facing members and an interposed metallic stiffening member therebetween engaging both of said facing members in their peripheral areas to maintain the same in predetermined relation, together with means at the hub of said spool head for uniting the elements thereof into a rigid structure.

In testimony whereof I have signed my name to this specification.

JOHN H. SAYRES.